3,686,214
THIOCARBAMOYL PYRROLIDINYL SULFIDES
Eiichi Morita, Copley, Ohio, assignor to Monsanto Company, St. Louis, Mo.
No Drawing. Filed June 8, 1970, Ser. No. 44,623
Int. Cl. C07d 27/04
U.S. Cl. 260—326.83                           6 Claims

ABSTRACT OF THE DISCLOSURE

A compound of the formula

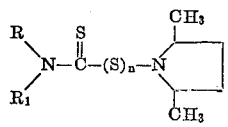

where R and $R_1$ independently are alkyl, cycloalkyl, aralkyl or R and $R_1$ together with the nitrogen atom form a heterocycle; and $n$ is one or two, which is an accelerator and vulcanizing agent for the vulcanization of rubber.

BACKGROUND OF THE INVENTION

The thiocarbamyl amine sulfides and disulfides are known to accelerate the vulcanization of rubber. Cooper U.S. Pats. 2,333,468 and 2,388,236; Carr and Smith U.S. 2,381,392; Imperial Chemical Industries Limited British Pat. 880,912; and Hardman U.S. 2,888,445. Cooper pointed out that piperidinothiocarbonyl N-piperidinesulfide is an especially potent accelerator. Hardman showed that piperidinothiocarbonyl N - dithiopiperidine also is a good accelerator for the vulcanization of rubber. The pyrrolidinyl sulfides and disulfides have not been heretofore described possibly because many of them lack the requisite stability or shelf life for commercial accelerators. It has now been discovered that the substitution of methyl groups in the 2,5-position on the pyrrolidine ring results in stable compounds possessing good storage characteristics and processing safety. These and other advantages of the compounds of this invention shall become apparent as the description proceeds.

SUMMARY OF THE INVENTION

Compounds of the formula

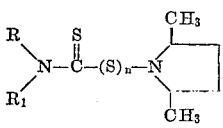

where R and $R_1$ independently are alkyl of 1 to 12 carbon atoms, cycloalkyl of 5 to 12 carbon atoms, aralkyl of 7 to 12 carbon atoms, or R and $R_1$ together with the nitrogen atom form a heterocycle of 4 to 6 carbon atoms and $n$ is one or two, have been found to be stable, delayed-action accelerators for the vulcanization of diene rubber.

Examples of radicals attached to the nitrogen atom are methyl, ethyl, propyl, isopropyl, butyl, isobutyl, sec.-butyl, tert-butyl, amyl, isoamyl, hexyl, octyl, decyl, dodecyl, cyclopentyl, cyclohexyl, cyclooctyl, benzyl and phenethyl. Examples of amines which form the

radicals upon removal of a hydrogen atom are dimethylamine, diethylamine, dipropylamine, dibutylamine, dihexylamine, dioctylamine, methylethylamine, diisopropylamine, diisoamylamine, tert-butylmethylamine, cyclohexylmethylamine, ethylhexylamine, butylethylamine, cyclohexylethylamine, dicyclohexylamine, dibenzylamine, pyrrolidine, 2,5-dimethyl pyrrolidine, piperidine, hexahydro-1(1H)-azepine, morpholine, 2,6 - dimethyl morpholine, N - methyl benzylamine, N - methyl cyclohexylamine, N - ethyl cyclohexylamine, N - butyl cyclohexylamine, N - isopropyl benzylamine, N - ethyl benzylamine, N-propyl cyclopentylamine, N-n-butyl cyclooctylamine and N-cyclohexyl benzylamine.

An important feature of the invention is that the sulfenamide sulfur is satisfied with 2,5-dimethyl pyrrolidinyl rather than pyrrolidinyl. The pyrrolidinyl sulfenamides are unstable and decompose upon standing whereas the 2,5-dimethyl pyrrolidinyl sulfenamides are stable and can be stored for long periods of time without substantial decomposition. In addition, the 2,5-dimethyl pyrrolidinyl sulfenamides have substantially greater processing safety than the pyrrolidinyl sulfenamides.

DESCRIPTION OF PREFERRED EMBODIMENTS

The new sulfides are prepared by oxidative condensation of a salt of the dithiocarbamic acid and an amine or by reaction of a salt of dithiocarbamic acid with an N-chloroamine. The new disulfides are prepared by the addition of carbon disulfide to a diaminomonosulfide. The disulfides are also prepared by reaction of an aminosulfenyl chloride with a salt of a dithiocarbamic acid.

Example 1

The preparation of 2,5-dimethyl - 1 - pyrrolidinyl 2,5-dimethyl - 1 - pyrrolidinethiocarbonyl disulfide is as follows:

Carbon disulfide (16 grams) is added to a stirred solution of 46 grams of bis(2,5-dimethylpyrrolidine)monosulfide in 200 ml. of methanol. The temperature rises from 26° C. to 34° C. in five minutes. The reaction mixture is heated to 60° C. in 15 minutes and the temperature is maintained for five minutes. The mixture is gradually cooled with stirring to room temperature. The methanol is removed under reduced pressure. An amber liquid is obtained which upon standing solidifies. The solid recrystallized from ethyl ether has a melting point of 70–71° C. Analysis of the product gives 30.92% sulfur and 9.08% nitrogen compared to 31.59% sulfur and 9.20% nitrogen calculated for $C_{13}H_{24}N_2S_3$.

Example 2

2,5-dimethyl-1-pyrrolidinyl 1 - pyrrolidinethiocarbonyl sulfide is prepared in the following manner. To a stirred solution containing 17.8 grams (0.25 mole) pyrrolidine and 40 grams (0.25 mole) 25% sodium hydroxide in 100 milliliters of water is added dropwise 19 grams (0.25 mole) carbon disulfide at 5–10° C. in ten minutes. The reaction mixture is stirred for one hour at 25–30° C. Then 100 grams (1.0 mole) of 2,5-dimethyl pyrrolidine is added in one portion which causes the temperature to rise from 25° C. to 40° C. A solution containing 64 grams of iodine and 63.5 grams of potassium iodide in 500 ml. of water is added dropwise to the reaction mixture at 25–30° C. in 1.5 hours and the mixture is stirred 30 minutes longer. The mixture is then cooled to 0–10° C. for thirty minutes. The product is recovered by filtration, washed with water until neutral, and air dried at 25–30° C. The tan solid recrystallized from petroleum ether melts at 72–73° C. Analysis gives 26.51% sulfur and 11.21% nitrogen compared to 26.24% sulfur and 11.46% nitrogen calculated for $C_{11}H_{20}N_2S_2$.

Example 3

2,5 - dimethyl - 1 - pyrrolidinyl 2,5-dimethyl-1-pyrrolidinethiocarbonyl sulfide is prepared by the method of Example 2 except 2,5-dimethylpyrrolidine is used in place of pyrrolidine. The organic layer is separated from the reaction mixture. 500 ml. of ether is added to this organic portion and the insoluble material is removed by filtration. The product which remains in the ether is recovered by vacuum stripping at 25–30° C. at 1–2 mm. The product is a dark amber viscous liquid. Analysis gives 10.14% nitrogen and 23.78% sulfur compared to 10.28% nitrogen and 23.54% sulfur calculated for $C_{13}H_{24}N_2S_2$.

Example 4

2,5-dimethyl-1-pyrrolidinyl dimethylthiocarbamyl sulfide is prepared as follows:

19 grams (0.25 mole) of carbon disulfide is added dropwise at 0–10° C. in ten minutes to 45 grams (0.25 mole) of 25% aqueous dimethylamine and 40 grams (0.25 mole) of 25% aqueous sodium hydroxide in 100 ml. of water. After stirring the mixture for one hour at 25° C., 100 grams (1.0 mole) of 2,5-dimethylpyrrolidine is added in one portion which causes the temperature to increase from 25° C. to 40° C. The reaction mixture is cooled to 25° C. and a solution containing 64 grams potassium iodide and 63.5 grams (0.25 mole) iodine in 500 ml. of water is added dropwise at 25–30° C. over a ninety minute period. The reaction mixture is stirred at 25–30° C. for thirty minutes. The product is recovered by filtration, washed with water until neutral and air dried at room temperature. The 2,5-dimethyl-1-pyrrolidinyl dimethylthiocarbamyl sulfide (recrystallized from isopropyl alcohol) melts at 100–101° C. Analysis gives 49.65% carbon, 8.55% hydrogen, 12.82% nitrogen and 29.18% sulfur compared to 49.50% carbon, 8.31% hydrogen, 12.83% nitrogen and 29.37% sulfur calculated for $C_9H_{18}N_2S_2$.

Example 5

2,5-dimethyl-1-pyrrolidinyl diethylthiocarbamyl sulfide is prepared in a manner similar to Example 4 except diethylamine is used in place of dimethylamine. The product is extracted in ether and recovered by vacuum stripping at 25–30° C. at 1–2 mm. Analysis gives 10.92% nitrogen compared to 11.37% nitrogen calculated for $C_{11}H_{22}N_2S_2$.

Base stocks designated Stock A for the natural rubber masterbatch and Stock B for the styrene-butadiene rubber masterbatch are compounded comprising

|  | Parts by wt. | |
| --- | --- | --- |
|  | Stock A | Stock B |
| Smoked sheets natural rubber | 100.0 |  |
| Styrene-butadiene rubber |  | 100.0 |
| Carbon black (HAF) | 50.0 | 50.0 |
| Sulfur | 2.5 | 1.75 |
| Zinc oxide | 5.0 | 4.0 |
| Stearic acid | 3.0 | 2.0 |
| Hydrocarbon softener | 3.0 | 10.0 |
| Total | 163.5 | 167.75 |

Accelerating amounts of the compounds of this invention are added to the masterbatches and the stocks are vulcanized in the usual manner by heating in a press at 144° C. for natural rubber stocks and 153° C. for SBR. The physical properties of vulcanizates are evaluated at optimum cure as determined by a Monsanto Rheometer. The results are shown in the table below.

The data show the compounds of this invention function effectively as accelerators in the vulcanization of diene rubbers. To illustrate the use of the disulfides of this invention as vulcanizing agents, 3.0 parts of 2,5-dimethyl - 1 - pyrrolidinyl-2,5-dimethyl-1-pyrrolidinethiocarbonyl disulfide and 0.5 part N-tert-butyl-2-benzothiazolesulfenamide, a commercial accelerator, are added to a masterbatch similar to Stock A except sulfur is absent. The stock is vulcanized by heating in a press at 144° C. for 40 minutes. The 300% modulus of the vulcanizate is 2890 lbs./sq. in. and the ultimate tensile strength is 4100 lbs./sq. in.

An important property of the compounds of this invention is their inherent stability. Analogous compounds having unsubstituted pyrrolidine rings in their structure are quite unstable and decompose upon standing. Indicative of stability of compounds of this invention is their ability to be stored for long periods of time while maintaining their high assay.

The compounds of this invention are delayed-action accelerators and vulcanizing agents. The property of delayed action is a valuable one, since this imparts processing safety to the rubber stocks and provides operating advantages to the rubber manufacturer. A measure of the delayed action of an accelerator or vulcanizing agent is the Mooney scorch time. For Stock A, Mooney scorch times at 121° C. are determined by means of a Mooney plastometer. For Stock B, Mooney scorch times are determined at 135° C. The time in minutes required for the Mooney reading to rise five points above the minimum is recorded. The compounds having no methyl substituents are prepared by the same procedures used to prepare the compounds containing the methyl substituents. Because of the tendency of the unsubstituted compounds to decompose, it is necessary to prepare the materials and test them immediately. The comparison of the scorch times in Stocks A and B are shown below. Equal weights of accelerators are tested in Stock A and equal molar amounts of accelerators are tested in Stock B.

|  | Scorch time ($t_5$) | |
| --- | --- | --- |
|  | Stock A | Stock B |
| Pyrrolidinyl 1-pyrrolidinethiocarbonyl sulfide | 9.9 | 12.4 |
| 2,5-dimethyl-1-pyrrolidinyl 1-pyrrolidinethiocarbonyl sulfide | 17.9 | 25.8 |
| Pyrrolidinyl dimethylthiocarbamyl sulfide | 10.3 | 15.7 |
| 2,5-dimethyl-1-pyrrolidinyl dimethylthiocarbamyl sulfide | 20.0 | 30.0 |
| Pyrrolidinyl diethylthiocarbamyl sulfide | 12.2 | 18.0 |
| 2,5-dimethyl-1-pyrrolidinyl diethylthiocarbamyl sulfide | 15.2 | 22.0 |
| Pyrrolidinyl 1-pyrrolidinethiocarbonyl sulfide | 9.9 | 12.4 |
| 2,5-dimethyl-1-pyrrolidinyl 2,5-dimethyl-1-pyrrolidinethiocarbonyl sulfide | 14.3 | 23.2 |
| Pyrrolidinyl 1-pyrrolidinethiocarbonyl disulfide * | 5.2 |  |
| 2,5-dimethyl-1-pyrrolidinyl 2,5-dimethyl-1-pyrrolidinethiocarbonyl disulfide * | 11.1 |  |

* Tested in the absence of sulfur in the previously described composition.

The difference in scorch times between the methylated pyrrolidinyl and the unmethylated pyrrolidinyl compounds indicates that the presence of the methyl groups markedly increases processing safety.

The new accelerators are effective in EPDM rubber. EPDM is a terpolymer of ethylene-propylene-diene mon-

| Accelerator | Stock | Amount, parts per 100 parts rubber | 300% modulus, lbs./in.² | Ultimate tensile strength, lbs./in.² |
| --- | --- | --- | --- | --- |
| 2,5-dimethyl-1-pyrrolidinyl 2,5-dimethyl-1-pyrrolidinethiocarbonyl disulfide. | A | 0.50 | 2,930 | 4,100 |
| 2,5-dimethyl-1-pyrrolidinyl-1-pyrrolidinethiocarbonyl sulfide | A | 0.50 | 3,590 | 4,100 |
|  | B | 0.73 | 2,800 | 2,800 |
| 2,5-dimethyl-1-pyrrolidinyl 2,5-dimethyl-1-pyrrolidinethiocarbonyl sulfide. | A | 0.50 | 3,000 | 4,200 |
|  | B | 0.82 | 2,540 | 3,500 |
| 2,5-dimethyl-1-pyrrolidinyl dimethylthiocarbamyl sulfide | A | 0.50 | 3,290 | 3,800 |
|  | B | 0.66 | 2,800 | 3,500 |
| 2,5-dimethyl-1-pyrrolidinyl diethylthiocarbamyl sulfide | A | 0.50 | 3,200 | 4,000 |
|  | B | 0.74 | 2,700 | 3,300 | omer. The EPDM used is sold under the name Nordel 1070. Evaluation of the EPDM accelerators is carried out in a masterbatch formulation comprising:

| | Parts by weight |
|---|---|
| EPDM | 100.0 |
| Zinc oxide | 5.0 |
| Carbon black | 80.0 |
| Aromatic processing oil | 40.0 |
| Sulfur | 1.5 |
| 2,2'-dithiobisbenzothiazole | 1.0 |
| Zinc dibutyl dithiophosphate (62%) | 1.5 |
| Accelerator | 1.0 |

The base formulation is evaluated with each sample of accelerator by heating each stock at 160° C. for 40 minutes. Illustrative examples of stress strain data from the vulcanized EPDM stocks are recorded in the table.

| Accelerator | 300% modulus | Ultimate tensile strength |
|---|---|---|
| 2,5-dimethyl-1-pyrrolidinyl 2,5-dimethyl-1-pyrrolidinethiocarbonyl disulfide | 1,800 | 3,359 |
| 2,5-dimethyl-1-pyrrolidinyl dimethylthiocarbamyl sulfide | 1,570 | 3,090 |

The accelerators and vulcanizing agents of this invention may be used with any diene rubber which is vulcanizable by sulfur or sulfur-containing compound. Examples of suitable sulfur vulcanizable diene rubbers are natural rubber, synthetic polyisoprene, styrene-butadiene copolymer rubber, butyl rubber, ethylene-propylene-diene terpolymer rubber (EPDM), butadiene-acrylonitrile copolymer rubber, chloroprene rubber or mixtures thereof.

The compounds of this invention are effective in rubber stocks containing the ingredients commonly found in rubber formulations such as prevulcanization inhibitors, various types of accelerators and vulcanizing agents, antidegradants and reinforcing agents.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as folows:

1. A compound of the formula

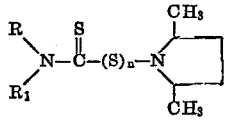

where R and $R_1$ independently are alkyl of 1 to 12 carbon atoms, cycloalkyl of 5 to 8 carbon atoms, aralkyl of 7 to 12 carbon atoms, or R and $R_1$ together with the nitrogen atom form a heterocycle selected from the group consisting of 1 - pyrrolidinyl, 2,5 - dimethyl-1-pyrrolidinyl, 1-piperidinyl, hexahydro-(1H)-azepinyl, morpholino and 2,6-dimethylmorpholino and $n$ is one or two.

2. A compound of claim 1 wherein R and $R_1$ are methyl and $n$ is one.

3. A compound of claim 1 wherein

is 1-pyrrolidinyl and $n$ is one.

4. A compound of claim 1 wherein R and $R_1$ are ethyl and $n$ is one.

5. A compound of claim 1 wherein

is 2,5-dimethyl-1-pyrrolidinyl and $n$ is one.

6. A compound of claim 1 wherein

is 2,5-dimethyl-1-pyrrolidinyl and $n$ is two.

References Cited

UNITED STATES PATENTS

| 2,333,468 | 4/1943 | Cooper. |
| 2,388,236 | 10/1945 | Cooper. |
| 2,888,445 | 5/1959 | Hardman. |

ALEX MAZEL, Primary Examiner

J. A. NARCAVAGE, Assistant Examiner

U.S.Cl. X.R.

260—247.1, 293.71, 784